United States Patent
Liu

(10) Patent No.: US 11,251,911 B2
(45) Date of Patent: Feb. 15, 2022

(54) DATA TRANSMISSION METHOD AND RELATED DEVICE

(71) Applicant: Autel Robotics Co., Ltd., Guangdong (CN)

(72) Inventor: Jingwen Liu, Guangdong (CN)

(73) Assignee: AUTEL ROBOTICS CO., LTD., Shenzhen (CN)

( * ) Notice: Subject to any disclaimer, the term of this patent is extended or adjusted under 35 U.S.C. 154(b) by 112 days.

(21) Appl. No.: 16/727,150

(22) Filed: Dec. 26, 2019

(65) Prior Publication Data
US 2020/0153562 A1 May 14, 2020

Related U.S. Application Data

(63) Continuation of application No. PCT/CN2018/080867, filed on Mar. 28, 2018.

(30) Foreign Application Priority Data

Jun. 26, 2017 (CN) .......................... 201710493371.1

(51) Int. Cl.
*H04W 4/00* (2018.01)
*H04L 1/18* (2006.01)
(Continued)

(52) U.S. Cl.
CPC ......... *H04L 1/1858* (2013.01); *G05D 1/0022* (2013.01); *H04L 1/008* (2013.01);
(Continued)

(58) Field of Classification Search
CPC ......... H04L 47/10; H04L 47/34; H04L 29/06; H04L 49/90; H04L 1/1829; H04L 1/1874;
(Continued)

(56) References Cited

U.S. PATENT DOCUMENTS

| 6,335,933 B1 * | 1/2002 | Mallory | H04L 1/1635 370/394 |
| 7,103,025 B1 * | 9/2006 | Choksi | H04L 1/1848 370/335 |

(Continued)

FOREIGN PATENT DOCUMENTS

| CN | 101179362 A | 5/2008 | |
| CN | 101924625 A * | 12/2010 | H04L 1/00 |

(Continued)

OTHER PUBLICATIONS

International Search Report dated Jun. 27, 2018; PCT/CN2018/080867.

*Primary Examiner* — Phuongchau B A Nguyen

(57) ABSTRACT

The present disclosure relates to an unmanned aerial vehicle (UAV), a terrestrial station thereof and a data transmission method. A data transmission method is applied to a terrestrial station and the method includes: receiving data packets continuously sent by a UAV; detecting continuity of data packet sequence numbers of the received data packets; and sending a data packet retransmission request to the UAV according to a lost data packet sequence number if it is detected that the data packet sequence numbers corresponding to the data packets are discontinuous. Adopting the UAV, the terrestrial station and the data transmission method that are provided in the present disclosure can effectively improve utilization of an uplink transmission link.

19 Claims, 9 Drawing Sheets

(51) Int. Cl.
*G05D 1/00* (2006.01)
*H04L 1/00* (2006.01)
*H04L 1/16* (2006.01)
*H04L 5/00* (2006.01)
*H04L 12/26* (2006.01)

(52) U.S. Cl.
CPC .......... *H04L 1/1628* (2013.01); *H04L 1/1642* (2013.01); *H04L 1/1861* (2013.01); *H04L 1/1864* (2013.01); *H04L 5/0055* (2013.01); *H04L 43/0835* (2013.01)

(58) Field of Classification Search
CPC . H04L 43/0829; H04L 5/0007; H04L 1/1858; H04L 1/008; H04L 1/1628; H04L 1/1642; H04L 1/1861; H04L 1/1864; H04L 5/0055; H04L 43/0835; H04L 1/1848; H04L 1/1896; H04L 1/1809; H04L 43/16; H04L 43/0882; H04Q 11/0478; H04W 28/04; H04W 72/04; H04W 72/042; H04W 88/08; G05D 1/0022; H04N 7/185; H04N 7/18
See application file for complete search history.

(56) References Cited

U.S. PATENT DOCUMENTS

| | | | | |
|---|---|---|---|---|
| 8,897,302 | B2* | 11/2014 | Sebastian | H04L 67/1097 370/390 |
| 8,923,123 | B2* | 12/2014 | Kulkarni | H04L 47/33 370/232 |
| 10,498,492 | B2* | 12/2019 | So | H04L 1/1864 |
| 10,506,245 | B2* | 12/2019 | Gu | H04N 19/89 |
| 2004/0027991 | A1* | 2/2004 | Jang | H04L 1/1809 370/230 |
| 2008/0219204 | A1* | 9/2008 | Lee | H04L 1/1812 370/315 |
| 2009/0052407 | A1* | 2/2009 | Motegi | H04W 28/10 370/336 |
| 2012/0269054 | A1* | 10/2012 | Fukushima | H04L 1/1877 370/216 |
| 2013/0166982 | A1* | 6/2013 | Zheng | H04L 1/18 714/748 |
| 2015/0019716 | A1* | 1/2015 | Kim | H04L 1/1825 709/224 |

FOREIGN PATENT DOCUMENTS

| | | | |
|---|---|---|---|
| CN | 101924625 A | | 12/2010 |
| CN | 103501259 A | | 1/2014 |
| CN | 105379164 A | | 3/2016 |
| CN | 106209915 A | * 12/2016 | ............ H04L 29/06 |
| CN | 106209915 A | | 12/2016 |
| JP | 5854461 B2 | | 2/2016 |

\* cited by examiner

DATA TRANSMISSION METHOD AND RELATED DEVICE

CROSS-REFERENCE

The present application is a continuation of International Patent Application No. PCT/CN2018/080867 filed on Mar. 28, 2018, which claims priority to Chinese Patent Application No. 201710493371.1 filed on Jun. 26, 2017, both of which are incorporated herein by reference in their entireties.

BACKGROUND

Technical Field

The present disclosure relates to the field of unmanned aerial vehicle technologies, and in particular, to a data transmission method and a related device.

Related Art

An unmanned aerial vehicles (UAV) may photograph a target object according to a control instruction of a terrestrial station, and transmits data such as a captured video to the terrestrial station, so that the terrestrial station can control the UAV to monitor the target object in real time.

In the foregoing process, a communication link is pre-established between the terrestrial station and the UAV. The communication link includes an uplink transmission link and a downlink transmission link. The uplink transmission link is used to transmit the control instruction of the terrestrial station to the UAV, and the downlink transmission link is used to transmit the data such as the video captured by the UAV to the terrestrial station.

Currently, in a point-to-point protocol between the UAV and the terrestrial station, bandwidth resources of the uplink transmission link are limited, much less than bandwidth resources of the downlink transmission link.

It can be seen that, how to improve utilization of the uplink transmission link still needs to be resolved.

SUMMARY

To resolve the foregoing technical problem, an objective of the present disclosure is to provide a data transmission method, a related device and a system.

The following technical solutions are adopted in the present disclosure:

A data transmission method is applied to a terrestrial station and includes: receiving data packets continuously sent by a UAV; detecting continuity of data packet sequence numbers of the received data packets; and sending a data packet retransmission request to the UAV according to a lost data packet sequence number if it is detected that the data packet sequence numbers corresponding to the data packets are discontinuous.

A data transmission method is applied to a UAV and includes: receiving a data packet retransmission request during continuous sending of data packets, the data packet retransmission request being sent by a terrestrial station to the UAV according to a lost data packet sequence number.

A terrestrial station includes: a data packet receiving module, configured to receive data packets continuously sent by a UAV; a data packet detection module, configured to detect continuity of data packet sequence numbers of the received data packets; and a retransmission request module, configured to send a data packet retransmission request to the UAV according to a lost data packet sequence number if it is detected that the data packet sequence numbers corresponding to the data packets are discontinuous.

A UAV includes: a request receiving module, configured to receive a data packet retransmission request during continuous sending of data packets, the data packet retransmission request being sent by a terrestrial station to the UAV according to a lost data packet sequence number.

A terrestrial station includes a processor and a storage medium, the storage medium storing a computer-readable instruction, and when executed by the processor, the computer-readable instruction implementing the data transmission method described above.

A UAV includes a processor and a storage medium, the storage medium storing a computer-readable instruction, and when executed by the processor, the computer-readable instruction implementing the data transmission method described above.

A data transmission method for a UAV and a terrestrial station includes: receiving, by a terrestrial station, data packets continuously sent by the UAV; detecting, by the terrestrial station, continuity of data packet sequence numbers of the received data packets; sending, by the terrestrial station, a data packet retransmission request to the UAV according to a lost data packet sequence number if it is detected that the data packet sequence numbers corresponding to the data packets are discontinuous; and receiving, by the UAV, the data packet retransmission request.

A data transmission system includes a UAV and a terrestrial station, where the UAV is wirelessly connected to the terrestrial station; the terrestrial station is configured to perform the data transmission method applied to a terrestrial station; and the UAV is configured to perform the data transmission method applied to a UAV.

In a process in which a UAV continuously sends data packets, a terrestrial station detects continuity of data packet sequence numbers of the received data packets and sends a data packet retransmission request to the UAV according to a lost data packet sequence number if detecting that the data packet sequence numbers corresponding to the data packets are discontinuous.

In other words, the terrestrial station requests the UAV to resend a data packet corresponding to the lost data packet sequence number only when detecting that the data packet sequence numbers corresponding to the data packets are discontinuous, to ensure data accuracy. In this process, an acknowledgement message is no longer transmission on an uplink transmission link, which greatly reduces a data transmission amount and ensures that bandwidth resources of the uplink transmission link can be fully applied to sending of a control instruction of the terrestrial station, thereby effectively improving utilization of the uplink transmission link.

In addition, the UAV can continuously send data packets without waiting for an acknowledgement message of the terrestrial station any longer, which not only reduces a data transmission delay but also effectively improves the utilization of the downlink transmission link.

It should be understood that the foregoing general descriptions and the following detailed descriptions are merely for exemplary and explanatory purposes and cannot limit the present disclosure.

DETAILED DESCRIPTION

Exemplary embodiments are described in detail herein, and examples of the exemplary embodiments are shown in the accompanying drawings. When the following descriptions involve the accompanying drawings, unless indicated otherwise, same numbers in different accompanying drawings represent same or similar elements. The implementations described in the following exemplary embodiments do not represent all implementations consistent with the present disclosure. On the contrary, the implementations are merely examples of apparatuses and methods that are described in detail in the appended claims and that are consistent with some aspects of the present disclosure.

As described above, data is transmitted between a terrestrial station and a UAV through a pre-established communication link. The communication link includes an uplink transmission link and a downlink transmission link. The uplink transmission link is used to transmit at least a control instruction of the terrestrial station to the UAV, and the downlink transmission link is used to transmit data such as a video captured by the UAV to the terrestrial station.

Figure 1:
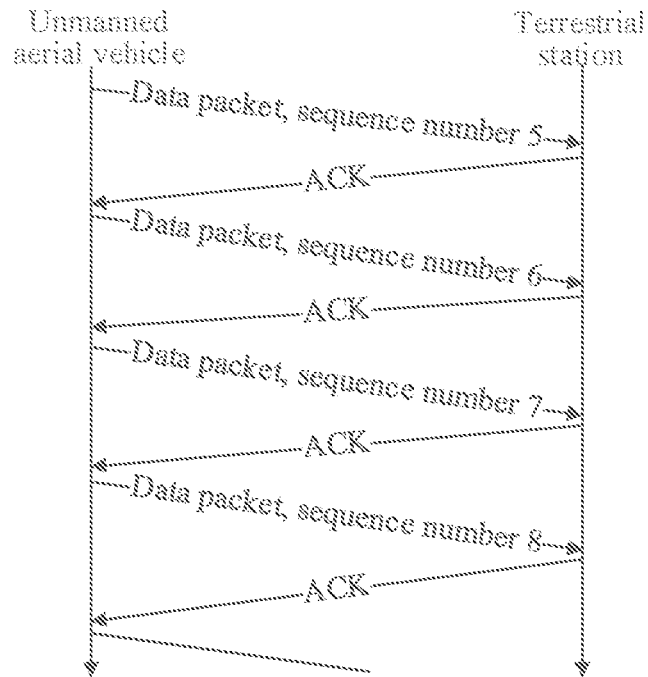
FIG. 1 is a sequence diagram of data transmission according to the prior art.

The communication link has a feature of openness of a wireless transmission channel, and data is easily interfered with during transmission. Consequently, data loss or a bit error is caused, and further data such as a video received by the terrestrial station cannot form an image or mosaics occur in a formed image. Therefore, after sending data, the UAV waits for an acknowledgement message (ACK) fed back by the terrestrial station, to ensure data accuracy, as shown in FIG. 1.

Figure 2:
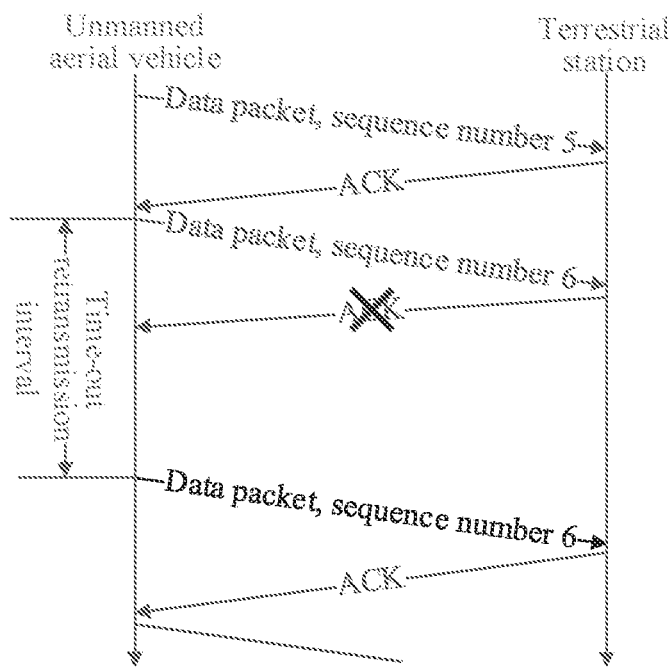
FIG. 2 is a sequence diagram of data retransmission according to the prior art.

If the UAV does not receive the acknowledgement message of the terrestrial station, it is considered that the data is lost, and therefore, the data is resent, until the acknowledgement message of the terrestrial station is received, as shown in FIG. 2.

In conclusion, the terrestrial station acknowledges each piece of data. When a large amount of data is transmitted, a large quantity of acknowledgement messages are generated correspondingly, and all bandwidth resources of the uplink transmission link may be occupied. Consequently, the control instruction cannot reach the UAV.

In addition, after sending the data, the UAV can continue to send a next piece of data only after waiting for the acknowledgement message. In this process, the UAV does not send any data, which reduces utilization of the downlink transmission link and improves a data transmission delay.

Based on this, the foregoing data transmission method still has a disadvantage of low utilization of the transmission link. Therefore, the present disclosure provides a data transmission method, and the data transmission method is used to replace the existing acknowledgement mechanism of the terrestrial station to ensure data accuracy, thereby effectively improving the utilization of the transmission link, especially the utilization of the uplink transmission link.

Figure 3:
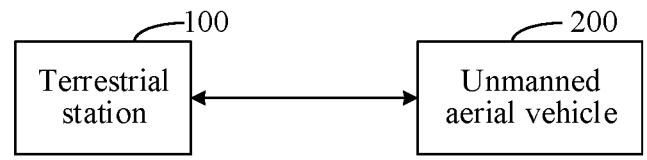
FIG. 3 is a schematic diagram of an implementation environment according to the present disclosure.

FIG. 3 is a schematic diagram of an implementation environment involved in the foregoing data transmission method. The implementation environment includes a terrestrial station 100 and a UAV 200.

The terrestrial station 100 may be a handheld remote control, a smartphone, a computer, a notebook computer or another electronic device that can be used for remotely controlling the UAV 200. The UAV may be an unmanned aerial vehicle and may include a plurality of implementations such as a fixed or rotor UAV, which are not limited therein.

The terrestrial station 100 is connected to the UAV 200 by using a wireless technology. A wireless communications technology may include any of a $3^{rd}$ Generation (3G), $4^{th}$ Generation (4G), or $5^{th}$ Generation (5G) communication protocol, Wireless Fidelity (Wi-Fi), or a manufacturer-defined communication protocol.

In an application scenario, the terrestrial station 100 sends a control instruction to the UAV 200, to control the UAV to photograph a target object according to the control instruction, and transmits data such as a captured video to the terrestrial station 100, so that the terrestrial station monitors the target object in real time by using the UAV 200.

Figure 4:
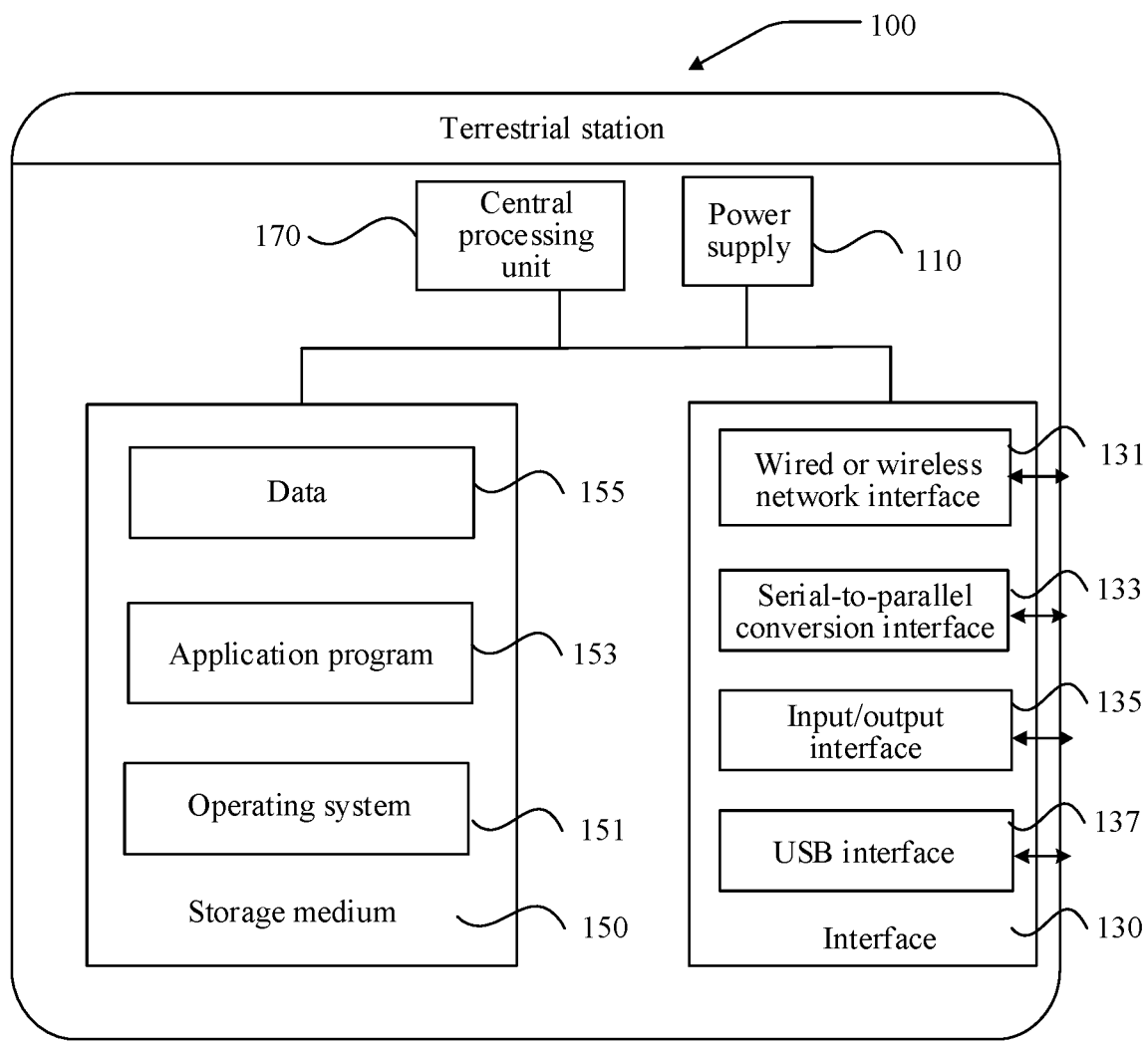
FIG. 4 is a block diagram of a hardware structure of a terrestrial station according to an exemplary embodiment.

FIG. 4 is a block diagram of a hardware structure of a terrestrial station 100 according to an exemplary embodiment. It should be noted that, the terrestrial station 100 is merely an example appropriate for the present disclosure and should not be considered as providing any limitation on the scope of use of the present disclosure. The terrestrial station 100 should not be interpreted as requiring one or more components in the exemplary terrestrial station 100 shown in FIG. 4.

The hardware structure of the terrestrial station 100 may differ greatly due to different configurations or different performance. As shown in FIG. 4, the terrestrial station 100 includes a power supply 110, an interface 130, at least one storage medium 150 and at least one central processing unit (CPU) 170.

The power supply 110 is configured to supply a working voltage for each hardware device on the terrestrial station 100.

The interface 130 includes at least one wired or wireless network interface 131, at least one serial-to-parallel conversion interface 133, at least one input/output interface 135, at least one USB interface 137 and the like and is configured to communicate with an external device.

As a resource storage carrier, the storage medium 150 may be a random storage medium, a magnetic disk, an optical disc or the like, and resources stored in the storage medium 150 include an operating system 151, an application program 153, data 155 and the like. A storage manner may be temporary storage or permanent storage. The operating system 151 is configured to manage and control each hardware device and the application program 153 on the terrestrial station 100, so that the central processing unit 170 calculates and processes the massive data 155, and the operating system 151 may be Windows Server™, Mac OS X™, Unix™, Linux™, FreeBSD™ or the like. The application program 153 is a computer program that completes at least one specific item of work based on the operating system 151 and may include at least one module (not shown in FIG. 4). Each module may include a series of operation instructions for the terrestrial station 100. The data 155 may be a photograph, a picture, flight data, and the like stored in the magnetic disk.

The central processing unit 170 may include one or more processors and is configured to communicate with the storage medium 150 by using a bus to calculate and process the data 155 in the storage medium 150.

As described in detail above, the terrestrial station 100 applicable to the present disclosure transmits data through reading a series of operation instructions stored in the storage medium 150 by using the central processing unit 170.

In addition, the present disclosure can also be implemented by using a hardware circuit or by using a hardware circuit combined with software instructions. Therefore, the implementation of the present disclosure is not limited to any particular hardware circuit, software or a combination of both.

Figure 5:
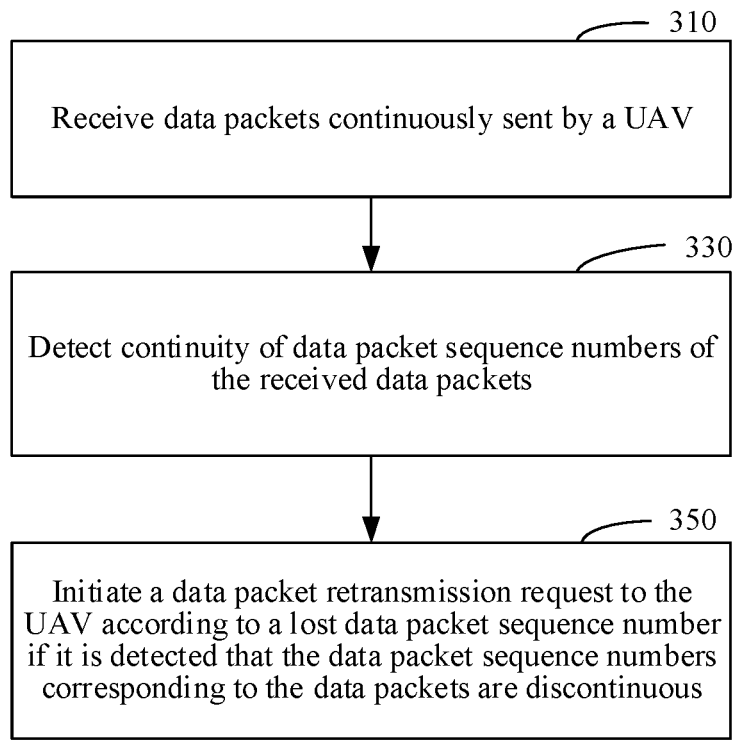
FIG. 5 is a flowchart of a data transmission method according to an exemplary embodiment.

Referring to FIG. 5, in an exemplary embodiment, a data transmission method is applicable to the terrestrial station 100 in the implementation environment shown in FIG. 3. The data transmission method may be performed by the terrestrial station 100 and may include the following steps:

Step 310. Receive data packets continuously sent by a UAV.

In the prior art, after sending a data packet, the UAV can continue to send a next data packet only after waiting for an acknowledgement message. In this process, the UAV does not send any data packet, which reduces utilization of the downlink transmission link and improves a data packet transmission delay.

Therefore, in this embodiment, the terrestrial station no longer acknowledges each data packet. In other words, the UAV can continuously send data packets without needing to wait for an acknowledgement message fed back by the terrestrial station.

The UAV may continuously send data packets until there is no to-be-sent data packet in a send buffer in the UAV or until the UAV receives a transmit stop instruction sent by the terrestrial station. The UAV may continuously send data packets in a data frame, or continuously send data packets in each data frame or continuously send data packets in a particular type of data frames, which is not limited herein.

Figure 6:
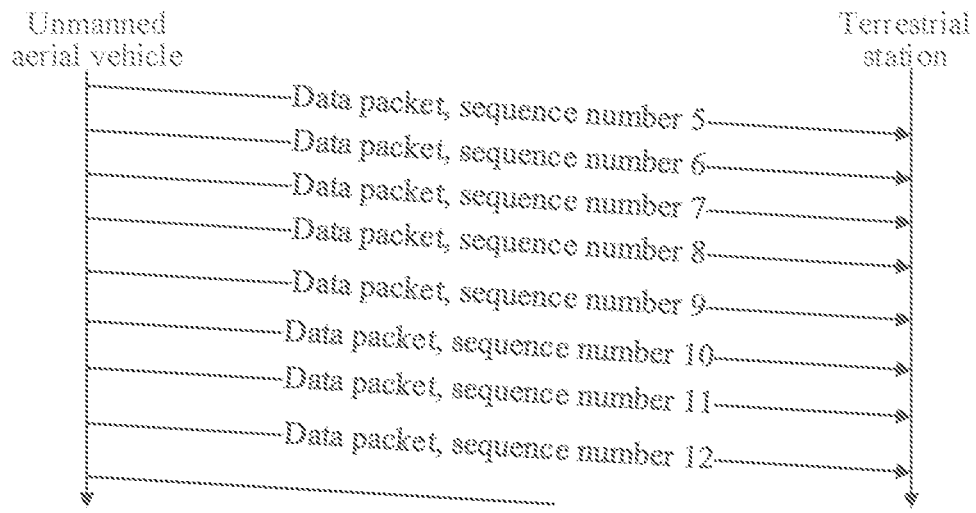
FIG. 6 is a sequence diagram of data transmission according to the present disclosure.

Correspondingly, the terrestrial station continuously receives the data packets sent by the UAV, as shown in FIG. 6.

Through such a setting, the UAV does not need to wait for the acknowledgement message fed back by the terrestrial station, thereby making maximum use of a wireless transmission channel, improving utilization of a downlink transmission link and reducing a data transmission delay.

Step 330. Detect continuity of data packet sequence numbers of the received data packets.

It should be understood that during data transmission, data is transmitted in frames and each frame of data is split into several data packets to reduce a data transmission delay. Correspondingly, the data packets have globally unique and continuous data packet sequence numbers.

In the absence of packet loss, the data packet sequence numbers corresponding to the data packets continuously received by the terrestrial station are continuous. As shown in FIG. 6, the data packet sequence numbers corresponding to the data packets continuously sent by the UAV are 5 to 12 and the sequence numbers are continuous. If the terrestrial station receives the data packets whose data packet sequence numbers are 5 to 12 respectively, when the terrestrial station detects continuity of the data packet sequence numbers corresponding to the data packets, the terrestrial station may detect that the data packet sequence numbers are continuous. If the terrestrial station does not receive any one or more of the data packets with the sequence numbers 5 to 12, when the terrestrial station detects continuity of the data packet sequence numbers corresponding to the data packets, the detected data packet sequence numbers are discontinuous, and a data packet corresponding to a data packet sequence number that is not detected may be interpreted as a lost data packet.

Based on this, after receiving the data packets, the terrestrial station detects the continuity of the data packet sequence numbers of the received data packets to determine whether packet loss exists, that is, whether a data packet is lost during data transmission.

In an implementation, each time the terrestrial station receives a data packet, the terrestrial station may perform data packet sequence number continuity detection on the received data packet, that is, detect whether a data packet sequence number corresponding to the currently received data packet is continuous with a data packet sequence number corresponding to a previously received data packet. If yes, no packets loss exists, and a next data packet may be received. For example, as shown in FIG. 6, when the terrestrial station receives a data packet, the terrestrial station determines that a data packet sequence number corresponding to the data packet is 6, and detects a data packet sequence number correspondingly to a previously received data packet. If the data packet sequence number corresponding to the previously received data packet is 4, a result of the data packet sequence number continuity detection is being discontinuous. If the data packet sequence number corresponding to the previously received data packet is 5, a result of the data packet sequence number continuity detection is being continuous, and then a next data packet may be received.

In another implementation, the terrestrial station may detect continuity of data packet sequence numbers of at least two received data packets, that is, detect whether the data packet sequence numbers corresponding to the at least two data packets are continuous, and if yes, may detect a next batch of data packets. For example, as shown in FIG. 6, the terrestrial station detects the continuity of the data packet sequence numbers after receiving the at least two data packets. For example, after receiving the data packet corresponding to the sequence number 5 and the data packet corresponding to the sequence number 6, the terrestrial station detects continuity of the data packet sequence numbers of the two data packets. Because the sequence numbers are continuous, a result of the data packet sequence number continuity detection is being continuous. If it is detected that data packet sequence numbers corresponding to at least two data packets are discontinuous, for example, the data packet sequence numbers corresponding to the at least two data packets include the sequence number 5 and a sequence number 7 and do not include the sequence number 6, a result of the data packet sequence number continuity detection is being discontinuous.

Optionally, the terrestrial station may perform data packet sequence number continuity detection on one or more data packets in a receive buffer each time.

If it is detected that the data packet sequence numbers corresponding to the data packets are discontinuous, step 350 is performed.

Step 350. Initiate a data packet retransmission request to the UAV according to a lost data packet sequence number.

The lost data packet sequence number is a data packet sequence number not detected during the data packet sequence number continuity detection.

In an implementation, the data packet retransmission request sent by the terrestrial station to the UAV may carry the lost data packet sequence number, so that after receiving the data packet retransmission request, the UAV may query for a data packet corresponding to the lost data packet sequence number according to the lost data packet sequence number carried in the data packet retransmission request and feed back the data packet corresponding to the lost data packet sequence number to the terrestrial station.

Figure 7:
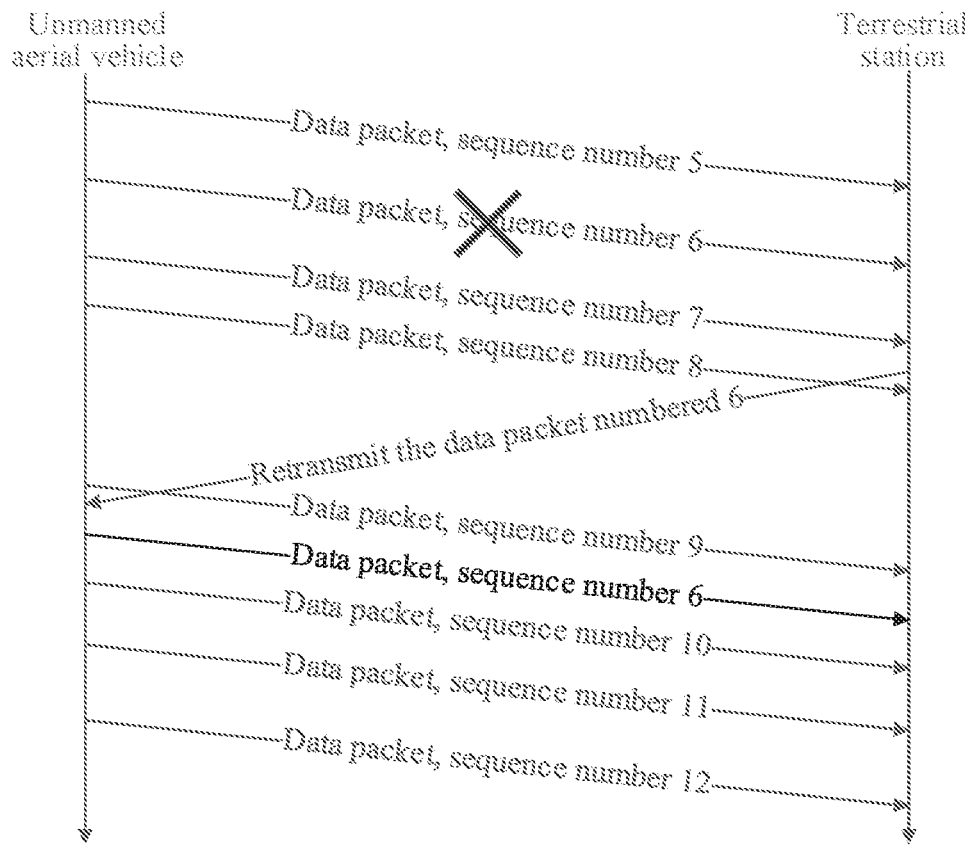
FIG. 7 is a sequence diagram of data packet loss according to the present disclosure.

For example, as shown in FIG. 7, the data packet whose data packet sequence number is 6 is lost during data transmission. In this case, after receiving the data packet whose data packet sequence number is 7, the terrestrial station detects the continuity of the data packet sequence numbers of the data packets and finds that the data packet sequence numbers corresponding to the data packets are discontinuous. That is, after the data packet whose data packet sequence number is 5 is received, the data packet whose data packet sequence number is 6 and that should be received does not arrive. In this case, it is determined that the data packet is lost and it is determined that the lost data packet sequence number is 6.

Correspondingly, the terrestrial station initiates a data packet retransmission request to the UAV according to the lost data packet sequence number 6, that is, requests the UAV to resend the data packet whose data packet sequence number is 6 to ensure integrity of data transmission and ensure accuracy of video data, thereby preventing a case in which the video data cannot form an image or mosaics occur in a formed image.

Optionally, the terrestrial station sends at least one data packet retransmission request to the UAV if there are at least two lost data packet sequence numbers, the data packet retransmission request carrying at least one lost data packet sequence number.

The at least two lost data packet sequence numbers detected by the terrestrial station may be lost data packet sequence numbers determined by the terrestrial station by detecting the continuity of the data packet sequence numbers of the data packets after receiving the data packets, or may be lost data packet sequence numbers that need to be resent and that are determined by the terrestrial station when the terrestrial station does not receive a data packet corresponding to the data packet retransmission request after sending the data packet retransmission request, or a combination of the foregoing two types of lost data packet sequence numbers, which is not limited herein.

In this case, the terrestrial station may send at least one data packet retransmission request, where each data packet retransmission request may carry or indicate at least one lost data packet sequence number.

In other words, the terrestrial station may send at least two lost data packet sequence numbers by using one data packet retransmission request or by using a plurality of data packet retransmission requests. If the terrestrial station performs sending by using one data packet retransmission request, the data packet retransmission request may carry or indicate all lost data packet sequence numbers.

Optionally, the terrestrial station may group or classify the at least two lost data packet sequence numbers, and configures one data packet retransmission request for each group or each classification. That is, the data packet retransmission request carries or indicates one group of or one classification of lost data packet sequence numbers. A manner in which the terrestrial station groups or classifies the lost data packet sequence numbers is not limited herein.

In a scenario, during data transmission, a data packet may be lost and a data packet retransmission request for requesting to retransmit a data packet may also be lost. Therefore, a plurality of data packets may all need to be retransmitted.

Figure 13:
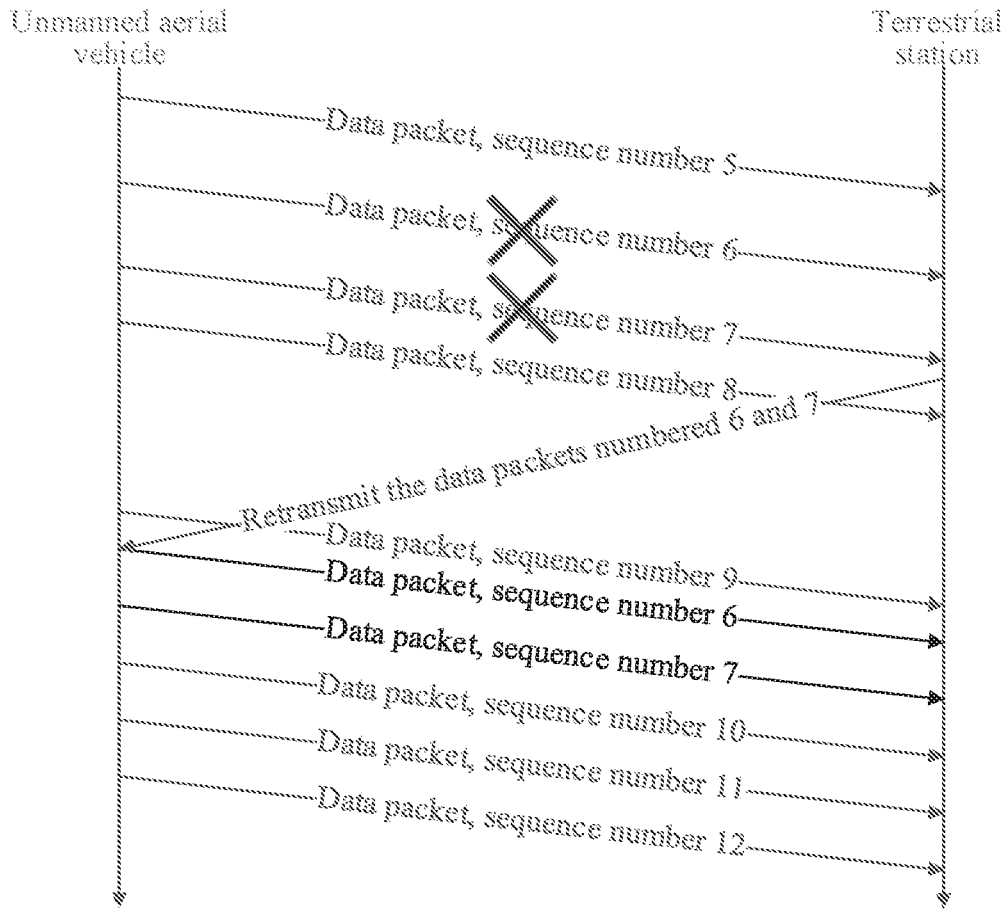
FIG. 13 is a sequence diagram of data packet retransmission request combination according to the present disclosure.

For example, as shown in FIG. 13, the data packet whose data packet sequence number is 6 is lost, and a data packet retransmission request for requesting to retransmit the data packet is also lost. In this case, the UAV further continuously sends data packets. Assuming that the data packet whose data packet sequence number is 7 is also lost, there two lost data packets at the same time. Correspondingly, the terrestrial station sends two data packet retransmission requests to the UAV for the two lost data packets.

It may be understood that, due to limited bandwidth resources of an uplink transmission link, if there are too many data packet retransmission requests, utilization of the uplink transmission link is still reduced.

Therefore, in this embodiment, several data packet retransmission requests are combined to help improve the utilization of the uplink transmission link and effectively reduce processing pressure of the terrestrial station and help improve processing efficiency of the terrestrial station. Optionally, for the UAV, in a process in which the UAV photographs a target object, new data packets are continuously generated. Considering the delay of data transmission, a send buffer is preconfigured in the UAV to store a to-be-sent data packet in the send buffer. The send buffer may be a physical memory, a random storage medium, a magnetic disk, an optical disc or the like.

In other words, the data packet that the terrestrial station requests the UAV to retransmit is to be stored in the send buffer.

Therefore, when the UAV receives the data packet retransmission request initiated by the terrestrial station according to the lost data packet sequence number, the UAV queries the send buffer for the lost data packet according to the lost data packet sequence number in the data packet retransmission request. That is, the UAV queries the send buffer to determine whether a data packet corresponding to the lost data packet sequence number exists.

The foregoing example is used for description. The UAV queries the send buffer to determine whether a data packet whose data packet sequence number is 6 exists, and if yes, retransmits the found data packet to the terrestrial station.

Certainly, the UAV may alternatively query for a lost data packet according to the data packet retransmission request in other manners and retransmit the lost data packet to the terrestrial station, that is, resend the lost data packet to the terrestrial station. Other manners are not limited herein.

Through the foregoing process, a lost data retransmission policy is implemented. That is, the terrestrial station requests retransmission from the UAV only when a packet is lost and does not need to acknowledge each data packet, thereby greatly reducing a data transmission amount of acknowledge messages on an uplink transmission link, preventing bandwidth resources of the uplink transmission link from being occupied by invalid data, and further effectively improving utilization of the uplink transmission link.

Figure 8:
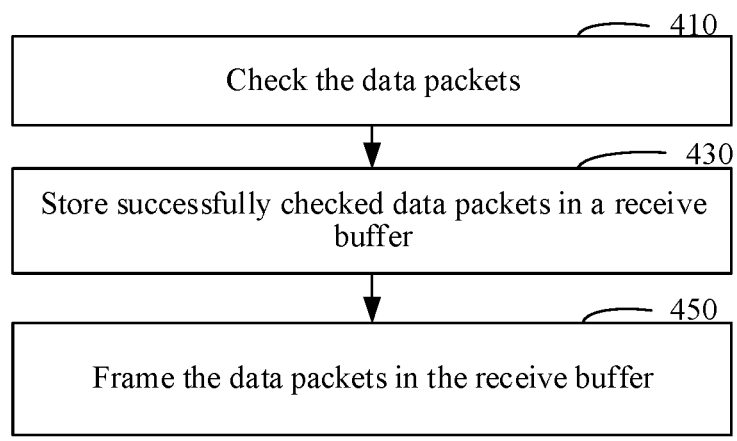
FIG. 8 is a flowchart of another data transmission method according to an exemplary embodiment.

Referring to FIG. 8, in an exemplary embodiment, before step 330, the method described above may further include the following steps:

Step 410. Check the data packets.

Step 430. Store successfully checked data packets in a receive buffer.

Bit errors existing during data transmission may cause an error in a data packet sequence number corresponding to a data packet. It may be understood that, if the data packet sequence number has an error, there is no need to detect continuity of the data packet sequence number.

Therefore, the data packet is first checked before the continuity of the data packet sequence number of the data packet is detected.

Specifically, validity of the data packet is first checked. For example, a bit error or the like of the data packet is checked. If a bit error rate is higher than a threshold, the data packet is unsuccessfully checked and the data packet is considered as invalid data. Correspondingly, the terrestrial station discards the data packet.

Second, when the data packet is successfully checked, the data packet is considered as valid data. Correspondingly, on the one hand, the terrestrial station detects the continuity of the data packet sequence number of the data packet, that is, further performs step 330, and on the other hand, the terrestrial station stores the data packet in a receive buffer and continuous to receive a next data packet.

Alternatively, after determining that the data packet is successfully checked, the terrestrial station stores the data packet in the receive buffer and detects the continuity of the data packet sequence number of the data packet in the receive buffer. In addition, the terrestrial station receives the next data packet, and if the next data packet is successfully checked, the terrestrial station stores the next data packet in the receive buffer and detects continuity of a data packet sequence number of the next data packet.

Alternatively, after determining that the data packet is successfully checked, the terrestrial station stores the data packet in the receive buffer and detects continuity of data packet sequence numbers of at least two data packets including the data packet in the receive buffer. In addition, the terrestrial station may continue to receive a next data packet and then detect continuity of data packet sequence numbers of at least two data packets including the next data packet that are received within a preset period.

The receive buffer is preconfigured in the terrestrial station and may be a physical memory, a random storage medium, a magnetic disk, an optical disc or the like.

Further, as shown in FIG. 8, the method described above may further include the following step:

Step 450. Frame the data packets in the receive buffer.

As described above, during data transmission, data is transmitted in frames and each frame of data is split into several data packets.

Correspondingly, after receiving several data packets included in a frame of data, the terrestrial station frames the several data packets.

Specifically, several data packets required by one frame of data are obtained through extraction from the data packets in the receive buffer and the several data packets recombined to form a frame of data.

Figure 9:
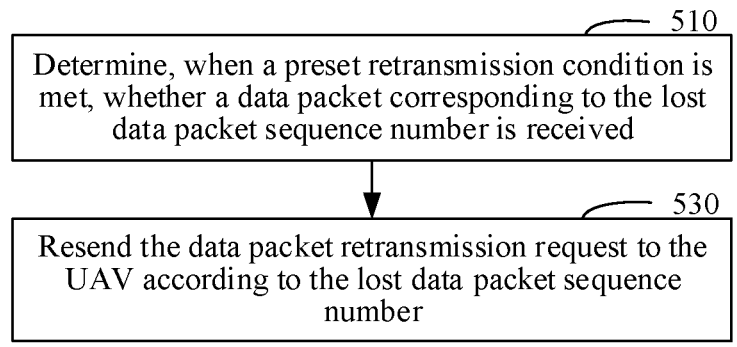
FIG. 9 is a flowchart of another data transmission method according to an exemplary embodiment.

Referring to FIG. 9, in an exemplary embodiment, after step 350, the method described above may further include the following step:

Step 510. Determine, when a preset retransmission condition is met, whether a data packet corresponding to the lost data packet sequence number is received.

It should be understood that, when data retransmission fails, data is retransmitted again. To improve data transmission efficiency, data transmission is not repeated unlimitedly, but instead, a retransmission condition is preset. That is, data retransmission is allowed only when the preset retransmission condition is met.

The preset retransmission condition may be a preset quantity of retransmission times, for example, when a quantity of data retransmission times reaches the preset quantity of retransmission times, data is no longer transmitted; or may be a preset retransmission time, for example, data retransmission is allowed within the preset retransmission time. Therefore, when the present retransmission condition is met, the terrestrial station first determines whether the data packet corresponding to the lost data packet sequence number is received, to further determine whether the data retransmission succeeds.

If the data packet corresponding to the lost data packet sequence number is already received, it indicates that the data retransmission performed by the UAV succeeds. In this case, the terrestrial station stops initiating the data packet retransmission request to the UAV. On the contrary, if the data packet corresponding to the lost data packet sequence number is not received, it indicates that the data retransmission performed by the UAV fails. In this case, step 530 is performed and the terrestrial station re-requests the UAV to perform data retransmission, until the preset retransmission condition is no longer met.

In another implementation, the terrestrial station first determines whether the data packet corresponding to the lost data packet sequence number is received, and if the data packet corresponding to the lost data packet sequence number is not received, the terrestrial station further determine whether the preset retransmission condition is met. If the preset retransmission condition is met, step 530 is performed; otherwise, the terrestrial station stops resending the data packet retransmission request to the UAV.

Specifically, the terrestrial station may first determine whether the data packet corresponding to the lost data packet sequence number is received within a preset receiving time; if the data packet corresponding to the lost data packet sequence number is not received, the terrestrial station may further determine whether the preset retransmission condition is met, for example, whether a quantity of times for which the UAV sends the data packet retransmission request is less than a preset threshold, or whether the terrestrial station currently still falls within a time range in which the terrestrial station can send the data packet retransmission request to the UAV; and if yes, the terrestrial station determines that the retransmission condition is met and then may perform step 530, that is, resend the data packet retransmission request, to request the UAV to retransmit the data packet corresponding to the lost data packet sequence number.

Step 530. Resend the data packet retransmission request to the UAV according to the lost data packet sequence number.

Figure 10:
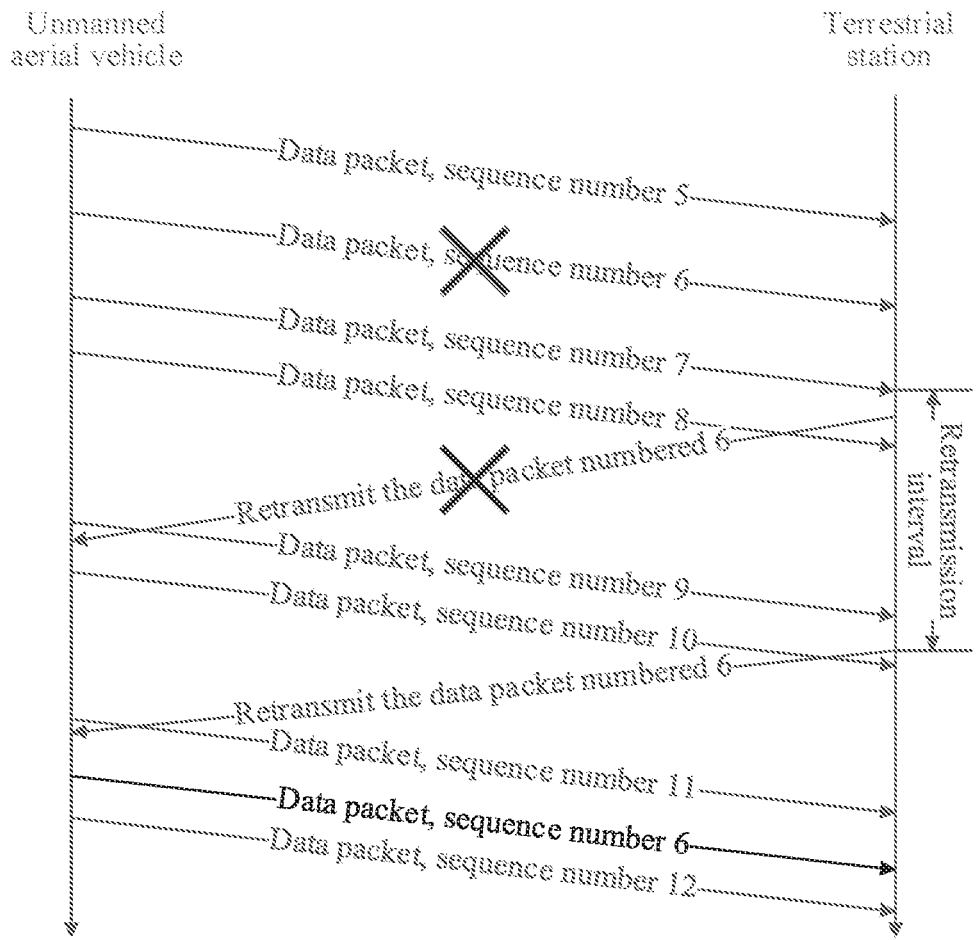
FIG. 10 is a sequence diagram of data retransmission according to the present disclosure.

For example, as shown in FIG. 10, a data packet retransmission request corresponding to the data packet whose data packet sequence number is 6 is lost during data transmission. Correspondingly, the terrestrial station cannot receive the data packet. In this case, when the terrestrial station determines that the preset retransmission condition is still met, the terrestrial station resends the data packet retransmission request corresponding to the data packet to the UAV. Alternatively, when the terrestrial station determines that the preset retransmission condition is still met, the terrestrial station may determine whether the data packet is received, and if the data packet is not received, the terrestrial station resends the data packet retransmission request corresponding to the data packet to the UAV.

Optionally, if the terrestrial station still does not receive the data packet when the preset retransmission condition is not met, the terrestrial station may perform framing by using other data packets in the buffer or other data packets included in a data frame to which the data packet belongs, which is not limited herein.

Through cooperation of the foregoing embodiments, data retransmission is performed for a limited quantity of times, which not only helps ensure data accuracy but also helps improve data transmission efficiency.

Figure 11:
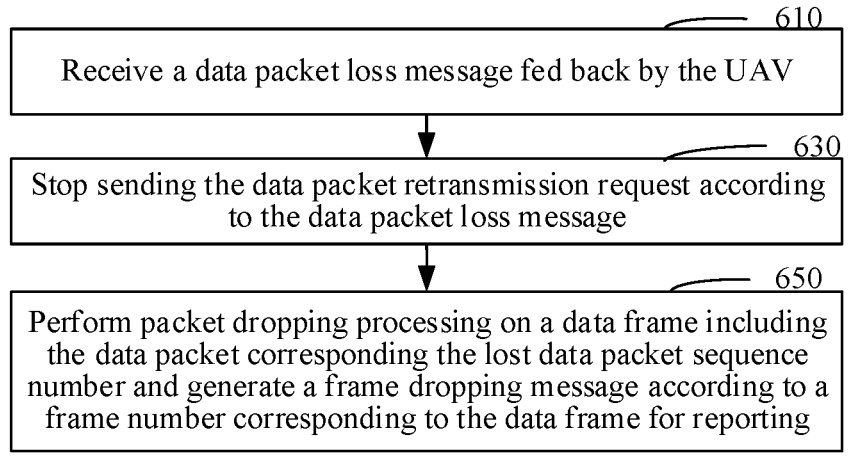
FIG. 11 is a flowchart of another data transmission method according to an exemplary embodiment.

Referring to FIG. 11, in an exemplary embodiment, after step 350, the method described above may further include the following step:

Step 610. Receive a data packet loss message fed back by the UAV.

The data packet loss message indicates that the UAV unsuccessfully sends the data packet corresponding to the lost data packet sequence number.

There may be various reasons that cause the UAV to unsuccessfully send the data packet. For example, the UAV does not find the data packet in the send buffer, or when the UAV sends the data packet, a transmission channel is blocked, and consequently, the data packet cannot be sent within a preset time, or the like.

Further, the UAV may further indicate a reason for unsuccessful sending in the sent data packet loss message. The terrestrial station may determine, according to the reason for the unsuccessful sending, whether the data packet retransmission request needs to be resent. For example, if the data packet loss message sent by the UAV indicates that the UAV does not find the data packet corresponding to the lost data packet sequence number, the terrestrial station may stop sending the corresponding data packet retransmission request. If the data packet loss message sent by the UAV indicates that the UAV cannot send the data packet within the preset time, the terrestrial station may determine, after receiving the message, to resend the data packet retransmission request after a particular period of time. In addition, the UAV continues to buffer the to-be-sent data packet.

In an implementation, when the UAV receives the data packet retransmission request initiated by the terrestrial station according to the lost data packet sequence number, the UAV queries the send buffer for the lost data packet according to the lost data packet sequence number in the data packet retransmission request. That is, the UAV queries the send buffer to determine whether a data packet corresponding to the lost data packet sequence number exists.

Further, because a storage space of the send buffer is limited, data packets in the send buffer need to be removed. Specifically, a buffer time is preset. That is, when a buffer time of a data packet in the send buffer reaches the preset buffer time, the data packet whose buffer time reaches the preset buffer time is removed.

Based on this, when the UAV queries the send buffer for a data packet, the data packet corresponding to the lost data packet sequence number may have a buffer time reaching the preset buffer time and is therefore removed.

Figure 12:
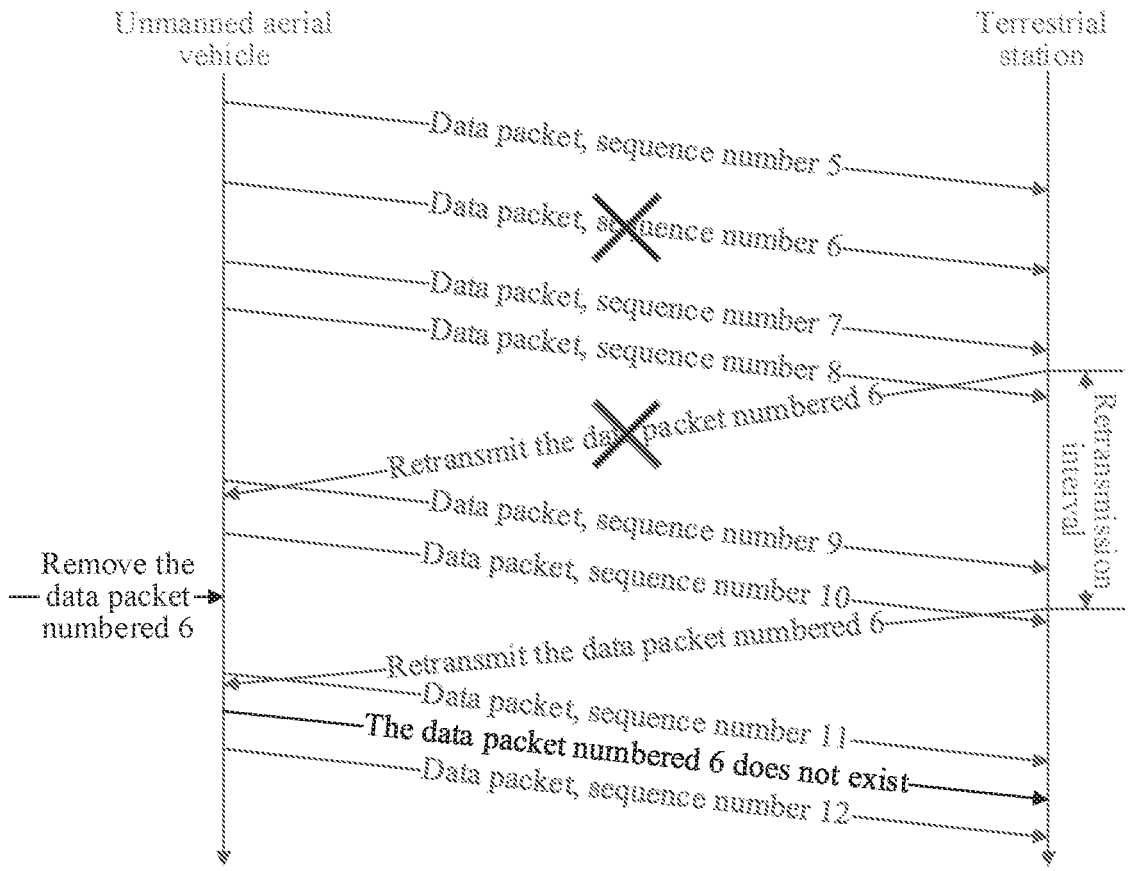
FIG. 12 is a sequence diagram of data packet removal according to the present disclosure.

As shown in FIG. 12, no data packet corresponding to the lost data packet sequence number 6 exists in the send buffer of the UAV. Correspondingly, the UAV generates a data packet loss message and feeds back the data packet loss message to the terrestrial station.

After receiving the data packet loss message sent by the UAV, the terrestrial station learns that the data packet corresponding to the lost data packet sequence number 6 does not exist.

On the one hand, stop requesting the UAV to retransmit the data packet corresponding to the lost data packet sequence number 6, perform step 630, and stop sending the data packet retransmission request including the lost data packet sequence number 6 to the UAV.

On the other hand, perform step 650, and perform packet dropping processing on the data packet corresponding to the lost data packet sequence number 6.

Step 630. Stop sending the data packet retransmission request according to the data packet loss message.

Further, as shown in FIG. 11, the method described above may further include the following step:

Step 650. Perform packet dropping processing on a data frame including the data packet corresponding the lost data packet sequence number.

In an implementation, the packet dropping processing is specifically finding, according to the lost data packet sequence number, a data frame to which the corresponding data packet belongs and discarding all data packets included in the data frame. Herein, the packet dropping processing may also be interpreted as frame dropping processing.

For example, a data frame whose frame number is 1 includes data packets whose data packet sequence numbers are 1 to 4 and a data frame whose frame number is 2 includes data packets whose data packet sequence numbers are 5 to 8. Assuming that the lost data packet sequence number is 6, other data packets included in the data frame whose frame number is 2 are discarded, that is, the data packets whose data packet sequence numbers are 5, 7 and 8 are discarded.

In another implementation, the packet dropping processing is specifically discarding only the data packet corresponding to the lost data packet sequence number. The terrestrial station resumes the data frame to which the data packet belongs according to other data packets included in the data frame. If discarded data packets in the data frame exceed a preset quantity threshold or exceed a preset proportion threshold, all data packets in the data frame are discarded.

Further, a frame dropping message may further be generated according to a frame number corresponding to the data frame and is reported to the UAV. In this way, the UAV may learn of the data frame that is not received by the terrestrial station. Therefore, the UAV may store or perform other processing on the data frame.

It should be noted that, an order in which step 630 and step 650 are performed is not limited in this embodiment of the present application.

Figure 14:
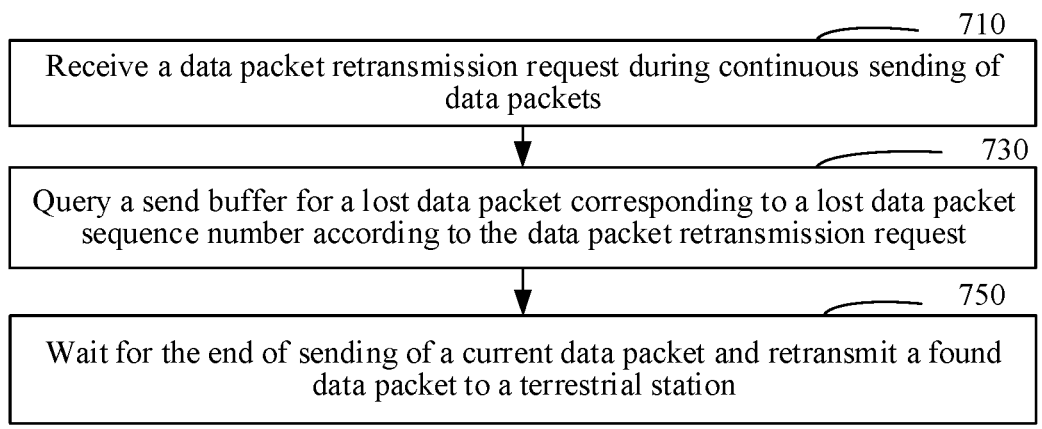
FIG. 14 is a flowchart of another data transmission method according to an exemplary embodiment.

Referring to FIG. 14, in an exemplary embodiment, a data transmission method is applicable to the UAV 200 in the implementation environment shown in FIG. 3. The data transmission method may be performed by the UAV 200 and may include the following steps:

Step 710. Receive a data packet retransmission request during continuous sending of data packets, the data packet retransmission request being sent by a terrestrial station to the UAV according to a lost data packet sequence number.

Optionally, the method may further include the following steps:

Step 730. Query a send buffer for a lost data packet corresponding to the lost data packet sequence number according to the data packet retransmission request.

Step 750. Retransmit the lost data packet to the terrestrial station if the lost data packet is found.

Through the foregoing process, the UAV can continuously send data packets without needing to wait for an acknowledgement message fed back by the terrestrial station and can retransmit a data packet based on a data packet retransmission request sent by the terrestrial station, thereby improving utilization of a downlink transmission link and reducing a data transmission delay.

Optionally, the method may further include the following step:

detecting whether a data packet is being sent currently if the lost data packet is found.

The retransmitting the lost data packet to the terrestrial station includes:

if a data packet is being sent currently, retransmitting the lost data packet to the terrestrial station after the data packet that is being sent currently is sent.

Specifically, when finding the lost data packet, the UAV may further detect whether a data packet is being sent currently. There may be one or more data packets being sent. For example, the data packet that is being sent currently is not the last data packet in a data frame to which the data packet belongs. To maintain sending continuity, data packets being sent may be interpreted as including the data packet that is being sent currently to the last data packet in the data frame. Alternatively, a data packet being sent refers only to a data packet that is being sent currently by the UAV.

If a data packet being sent as defined above exists, the UAV may retransmit the lost data packet to the terrestrial station after waiting for completion of sending of the data packet being sent.

Optionally, if the retransmitted lost data packet carries or indicates at least two lost data packet sequence numbers, data packets respectively corresponding to the at least two lost data packet sequence numbers may be queried for and the data packets are sequentially sent to the terrestrial station.

In an exemplary embodiment, after step 730, the method described above may further include the following step:

feeding back a data packet loss message to the terrestrial station if the data packet corresponding to the lost data packet sequence number is not found in the send buffer.

In an exemplary embodiment, before the step of feeding back a data packet loss message to the terrestrial station if the data packet corresponding to the lost data packet sequence number is not found in the send buffer, the method described above may further include the following step:

removing, when a data packet whose buffer time reaches a preset buffer time in the send buffer, the data packet whose buffer time reaches the preset buffer time.

Under effect of the foregoing embodiment, timed clearing of the send buffer is implemented, which helps improve a storage capability and storage utilization of the send buffer.

Figure 15:
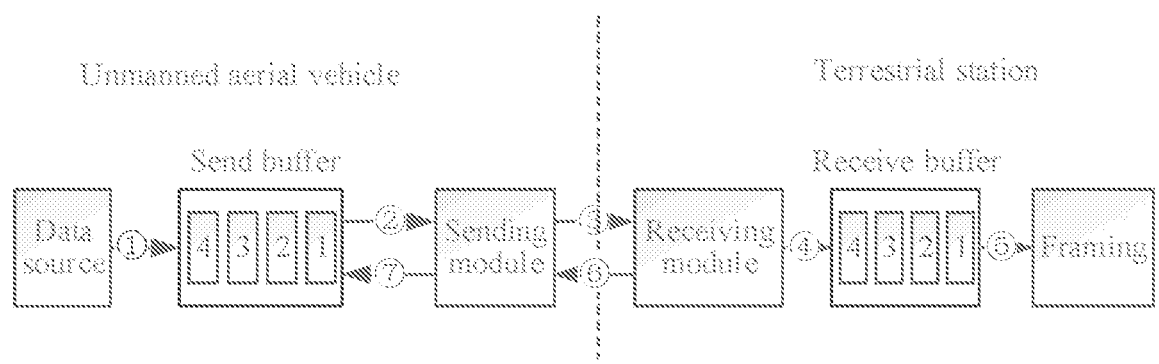
FIG. 15 is a schematic diagram of a specific implementation of a data transmission method in an application scenario.

FIG. 15 is a schematic diagram of a specific implementation of a data transmission method in an application scenario. A data transmission process is described with reference to the implementation environment shown in FIG. 3 and the application scenario shown in FIG. 15.

When the UAV 200 photographs a target object in real time, the UAV 200 continuously generates new data packets ① and stores the data packets in a send buffer to be sent to the terrestrial station 100.

Correspondingly, a sending module of the UAV 200 obtains to-be-sent data packets ② from the send buffer and continuously sends the data packets ② to the terrestrial station 100.

The terrestrial station 100 receives, by using a receiving module, data packets ③ continuously sent by the UAV 200 and checks validity of the received data packets ③.

If the data packets ③ are successfully checked, on the one hand, the successfully checked data packets ④ are stored in a receive buffer and a framing module further obtains data packets ⑤ from the receive buffer for framing.

On the other hand, continuity of data packet sequence numbers of the data packets ③ are further detected, and if it is detected that the data packet sequence numbers corresponding to the data packets ③ are discontinuous, the UAV 200 is requested to resend the data packets ③.

The sending module of the UAV 200 receives a data packet retransmission request ⑥ and obtains a lost data packet sequence number ⑦ through exaction from the data packet retransmission request ⑥.

Further, the send buffer is queried for a lost data packet according to the lost data packet sequence number ⑦, and if the data packet corresponding to the lost data packet sequence number is found, the data packet is retransmitted to the terrestrial station 100.

On the contrary, if the data packet corresponding to the lost data packet sequence number, a data packet loss message is generated and fed back to the terrestrial station 100, so that the terrestrial station 100 learns that no data packet corresponding to the lost data packet sequence number exists in the send buffer of the UAV 200 and then stops sending the data packet retransmission request.

In the embodiments of the present disclosure, the terrestrial station does not need to feed back an acknowledgement message to the UAV and the UAV continuously send data packets to the terrestrial station without needing to wait for the acknowledgement message, to fully use a wireless transmission channel, thereby effectively improving utilization of a transmission link and effectively reducing a data transmission delay.

The following is an apparatus embodiment of the present disclosure and may be used to perform the data transmission method involved in the present disclosure. For details that are not disclosed in the apparatus embodiment of the present disclosure, refer to the embodiment of the data transmission method involved in the present disclosure.

Figure 16:
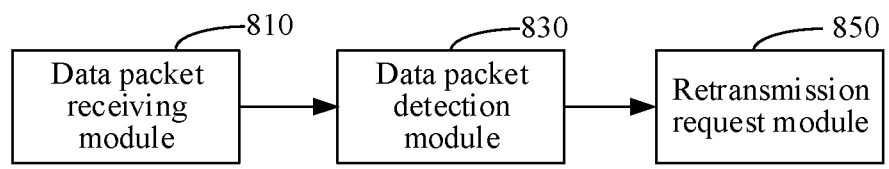
FIG. 16 is a block diagram of a terrestrial station according to an exemplary embodiment.

Referring to FIG. 16, in an exemplary embodiment, a terrestrial station 800 includes but is not limited to a data packet receiving module 810, a data packet detection module 830 and a retransmission request module 850.

The data packet receiving module 810 is configured to receive data packets continuously sent by a UAV.

The data packet detection module 830 is configured to detect continuity of data packet sequence numbers of the received data packets.

The retransmission request module 850 is configured to send a data packet retransmission request to the UAV according to a lost data packet sequence number if it is detected that the data packet sequence numbers corresponding to the data packets are discontinuous.

In an exemplary embodiment, the terrestrial station 800 further includes but is not limited to a data packet check module.

The data packet check module is configured to check the received data packets.

The data packet detection module is further configured to detect the continuity of the data packet sequence numbers of the received data packets if the received data packets are successfully checked.

In an exemplary embodiment, the terrestrial station 800 further includes but is not limited to a data packet storage module.

The data packet storage module is configured to store, if the received data packets are successfully checked, the successfully checked data packets in a receive buffer.

Further, the terrestrial station 800 further includes but is not limited to a data packet framing module.

The data packet framing module is configured to frame the data packets in the receive buffer if it is detected that the sequence numbers of the received data packets are continuous.

In an exemplary embodiment, the retransmission request module is specifically configured to send at least one data packet retransmission request to the UAV if there are at least two lost data packet sequence numbers, the data packet retransmission request carrying at least one lost data packet sequence number.

In an exemplary embodiment, the terrestrial station 800 further includes but is not limited to a first determining module.

The first determining module is configured to determine, when a preset retransmission condition is met, whether a data packet corresponding to the lost data packet sequence number is received; and instruct the retransmission request module to resend the data packet retransmission request to the UAV according to the lost data packet sequence number if the data packet corresponding to the lost data packet sequence number is not received.

In an exemplary embodiment, the terrestrial station 800 further includes but is not limited to a second determining module and a third determining module.

The second determining module is configured to determine whether a data packet corresponding to the lost data packet sequence number is received.

The third determining module is configured to determine whether a preset retransmission condition is met if the data packet corresponding to the lost data packet sequence number is not received; and instruct the retransmission request module to resend the data packet retransmission request to the UAV according to the lost data packet sequence number if the preset retransmission condition is met.

In an exemplary embodiment, the terrestrial station 800 further includes but is not limited to a message receiving module and a retransmission stop module.

The message receiving module is configured to receive a data packet loss message fed back by the UAV, the data packet loss message indicating that the UAV unsuccessfully sends the lost data packet corresponding to the lost data packet sequence number.

The retransmission stop module is configured to stop sending the data packet retransmission request according to the data packet loss message.

Further, the terrestrial station 800 further includes but is not limited to a frame dropping module.

The frame dropping module is configured to perform packet dropping processing on a data frame comprising the data packet corresponding the lost data packet sequence number.

Figure 17:
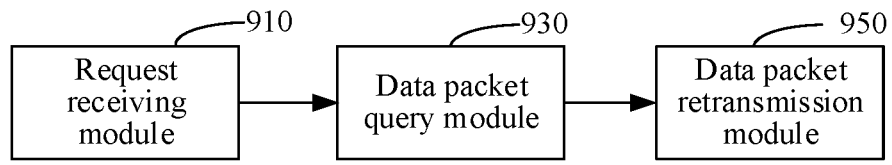
FIG. 17 is another block diagram of a UAV according to an exemplary embodiment.

Referring to FIG. 17, in an exemplary embodiment, a UAV 900 includes but is not limited to a request receiving module 910, a data packet query module 930 and a data packet retransmission module 950.

The request receiving module 910 is configured to receive a data packet retransmission request during continuous sending of data packets. The data packet retransmission request is sent by a terrestrial station to the UAV according to a lost data packet sequence number.

The data packet query module 930 is configured to query a send buffer for a lost data packet corresponding to the lost data packet sequence number according to the data packet retransmission request.

The data packet retransmission module 950 is configured to retransmit the lost data packet to the terrestrial station if the lost data packet is found.

In an exemplary embodiment, the UAV 900 further includes but is not limited to a detection module.

The detection module is configured to detect whether a data packet is being sent currently if the lost data packet is found; and if detecting that a data packet is being sent currently, instruct the data packet retransmission module to retransmit the lost data packet to the terrestrial station after the data packet that is being sent currently is sent.

In an exemplary embodiment, the UAV 900 further includes but is not limited to a message sending module.

The message sending module is configured to feed back a data packet loss message to the terrestrial station if the lost data packet is not found, the data packet loss message indicating that the lost data packet is unsuccessfully sent.

In an exemplary embodiment, the UAV 900 further includes but is not limited to a data packet removal module.

The data packet removal module is configured to remove, when a data packet whose buffer time reaches a preset buffer time in the send buffer, the data packet whose buffer time reaches the preset buffer time.

It should be noted that, when the terrestrial station/UAV provided in the foregoing embodiment performs data retransmission, only divisions of the foregoing function modules are described by using an example. During actual application, the foregoing functions may be allocated to and completed by different function modules according to requirements, that is, the internal structure of the terrestrial station/UAV is divided into different function modules, to complete all or some of the foregoing described functions.

In addition, the terrestrial station/UAV provided in the foregoing embodiment and the embodiment of the data transmission method belong to a same idea, a specific manner in which each module performs an operation has been described in detail in the method embodiment, and details are not described herein again.

Figure 18:
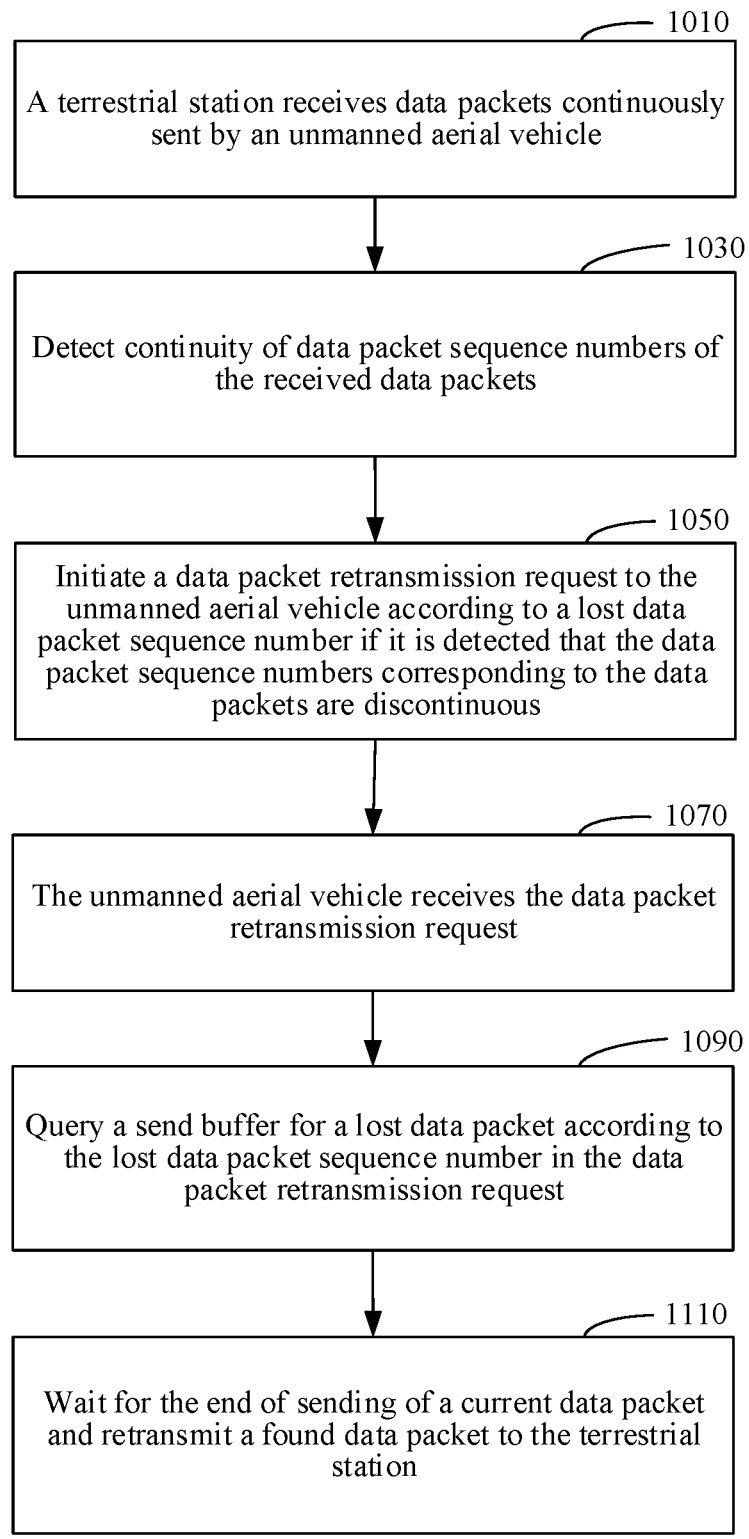
FIG. 18 is a flowchart of a data transmission method for a UAV and a terrestrial station according to an exemplary embodiment.

Referring to FIG. 18, in an exemplary embodiment, a data transmission method for a UAV and a terrestrial station is applicable to the terrestrial station 100 and the UAV 200 in the implementation environment shown in FIG. 3 and may include the following steps:

Step 1010. The terrestrial station receives data packets continuously sent by the UAV.

To avoid a case in which the UAV needs to first wait for an acknowledgement message after sending a data packet and therefore an extremely large data packet transmission delay is caused and utilization of a downlink transmission link is relatively low, in this embodiment, the UAV can continuously send data packets without needing to wait for an acknowledgement message fed back by the terrestrial station.

Correspondingly, the terrestrial station can receive the data packets continuously sent by the UAV.

Through such a setting, a wireless transmission channel is fully used, utilization of a downlink transmission link is improved and a data transmission delay is reduced.

Step 1030. Detect continuity of data packet sequence numbers of the received data packets.

As described above, in the absence of packet loss, the data packet sequence numbers corresponding to the data packets continuously received by the terrestrial station are continuous.

Based on this, the terrestrial station can detect the continuity of the data packet sequence numbers of the received data packets to determine whether packet loss exists during data transmission.

If it is detected that the data packet sequence numbers corresponding to the data packets are continuous, return to step 1010, and continue to receive a next data packet sent by the UAV.

On the contrary, if it is detected that the data packet sequence numbers corresponding to the data packets are discontinuous, jump to step 1050.

Step 1050. Initiate a data packet retransmission request to the UAV according to a lost data packet sequence number.

Step 1070. The UAV receives the data packet retransmission request.

If the terrestrial station detects that the data packet sequence numbers corresponding to the data packets are discontinuous, it indicates that packet loss occurs during data transmission. In this case, the terrestrial station requests the UAV to retransmit a data packet corresponding to the lost data packet sequence number.

Correspondingly, the UAV can receive the data packet retransmission request initiated by the terrestrial station for the lost data packet sequence number.

Step 1090. Query a send buffer for a lost data packet according to the lost data packet sequence number in the data packet retransmission request.

As described above, a send buffer is preconfigured in the UAV to store to-be-sent data packets in the send buffer. In other words, the data packet that corresponds to the lost data packet sequence number and that the terrestrial station requests to retransmit is stored in the send buffer preconfigured in the UAV.

Therefore, before retransmitting the data packet, the UAV first queries the send buffer to determine whether a data packet corresponding to the lost data packet sequence number exists.

If the data packet corresponding to the lost data packet sequence number exists, jump to step 1110, and retransmit the found data packet to the terrestrial station. In this way, data retransmission is completed and data accuracy is ensured.

On the contrary, if the data packet corresponding to the lost data packet sequence number does not exist, the UAV generates a data packet loss message and feeds back the data packet loss message to the terrestrial station, the data packet loss message being used to indicate that the data packet corresponding to the lost data packet sequence number does not exist in the send buffer of the UAV, so that the terrestrial station learns that the data packet that is requested to retransmit does not exist, correspondingly stops sending the data packet retransmission request to the UAV, and performs packet dropping processing on the data packet corresponding to the lost data packet sequence number, for example, discards all data packets that are supposed to be included in a data frame of the data packet.

Step 1110. Wait for the end of sending of a current data packet and retransmit a found data packet to the terrestrial station.

In the process of interaction between the terrestrial station and the UAV involved in the foregoing embodiment, the UAV can continuously send data packets without needing to wait for an acknowledgement message of the terrestrial station, and the terrestrial station can continuously receive data packets whose data packet sequence numbers are continuous and that are sent by the UAV, determine, based on this, whether a data packet is lost, and then request, when the data packet sequence numbers are discontinuous, the UAV to resend a data packet corresponding a lost data packet sequence number, which reduces a data transmission delay, improves utilization of a downlink transmission link, and prevents the terrestrial station from transmitting the acknowledgement message by using the uplink transmission link, thereby improving utilization of an uplink transmission link.

A terrestrial station for a UAV includes a processor and a storage medium.

The storage medium stores a computer-readable instruction and when executed by the processor, the computer-readable instruction implements the foregoing data transmission method applied to a terrestrial station.

A UAV includes a processor and a storage medium.

The storage medium stores a computer-readable instruction and when executed by the processor, the computer-readable instruction implements the foregoing data transmission method applied to a UAV.

The foregoing content is merely preferred exemplary embodiments of the present disclosure and is not used to limit implementation solutions of the present disclosure. A person of ordinary skill in the art may conveniently make corresponding variants or modifications according to the main idea and spirit of the present disclosure. Therefore, the protection scope of the present disclosure should be subject to the protection scope required by the claims.

What is claimed is:

1. A data transmission method performed by a terrestrial station, comprising:
   receiving data packets continuously sent by an unmanned aerial vehicle (UAV);
   detecting continuity of data packet sequence numbers of the received data packets; and
   sending a data packet retransmission request to the UAV according to a lost data packet sequence number if it is detected that the data packet sequence numbers corresponding to the data packets are discontinuous;
   performing packet dropping processing on a data frame comprising the data packet corresponding the lost data packet sequence number, wherein the packet dropping processing is finding, according to the lost data packet sequence number, the data frame to which the corresponding data packet belongs and discarding all data packets included in the data frame; and
   generating a frame dropping message according to a frame number corresponding to the data frame and is reported to the UAV.

2. The method according to claim 1, wherein before the detecting continuity of data packet sequence numbers of the received data packets, the method further comprises:
  checking the received data packets; and
  the detecting continuity of data packet sequence numbers of the received data packets comprises:
  detecting the continuity of the data packet sequence numbers of the received data packets if the received data packets are successfully checked.

3. The method according to claim 2, wherein the method further comprises:
  storing the received data packets in a receive buffer if the received data packets are successfully checked.

4. The method according to claim 3, wherein the method further comprises:
  framing the data packets in the receive buffer if it is detected that the sequence numbers of the received data packets are continuous.

5. The method according to claim 1, wherein the sending a data packet retransmission request to the UAV according to a lost data packet sequence number comprises:
  sending at least one data packet retransmission request to the UAV if there are at least two lost data packet sequence numbers, the data packet retransmission request carrying at least one lost data packet sequence number.

6. The method according to claim 1, wherein after the sending a data packet retransmission request to the UAV according to a lost data packet sequence number, the method further comprises:
  determining, when a preset retransmission condition is met, whether a data packet corresponding to the lost data packet sequence number is received; and
  resending the data packet retransmission request to the UAV according to the lost data packet sequence number if the data packet corresponding to the lost data packet sequence number is not received.

7. The method according to claim 1, wherein after the sending a data packet retransmission request to the UAV according to a lost data packet sequence number, the method further comprises:
  determining whether a data packet corresponding to the lost data packet sequence number is received;
  determining whether a preset retransmission condition is met if the data packet corresponding to the lost data packet sequence number is not received; and
  resending the data packet retransmission request to the UAV according to the lost data packet sequence number if the preset retransmission condition is met.

8. The method according to claim 1, wherein after the sending a data packet retransmission request to the UAV according to a lost data packet sequence number, the method further comprises:
  receiving a data packet loss message fed back by the UAV, the data packet loss message indicating that the UAV unsuccessfully sends the lost data packet corresponding to the lost data packet sequence number; and
  stopping sending the data packet retransmission request according to the data packet loss message.

9. A data transmission method, comprising:
  receiving, by a terrestrial station, data packets continuously sent by an unmanned aerial vehicle (UAV);
  detecting, by the terrestrial station, continuity of data packet sequence numbers of the received data packets;
  sending, by the terrestrial station, a data packet retransmission request to the UAV according to a lost data packet sequence number if it is detected that the data packet sequence numbers corresponding to the data packets are discontinuous;
  performing, by the terrestrial station, packet dropping processing on a data frame comprising the data packet corresponding the lost data packet sequence number, wherein the packet dropping processing is finding, according to the lost data packet sequence number, the data frame to which the corresponding data packet belongs and discarding all data packets included in the data frame; and
  generating, by the terrestrial station, a frame dropping message according to a frame number corresponding to the data frame and is reported to the UAV; and
  receiving, by the UAV, the data packet retransmission request.

10. The method according to claim 9, wherein after the receiving the data packet retransmission request, the method further comprises:
  querying a send buffer for a lost data packet corresponding to the lost data packet sequence number according to the data packet retransmission request; and
  retransmitting the lost data packet to the terrestrial station if the lost data packet is found.

11. The method according to claim 10, wherein the method further comprises:
  detecting whether a data packet is being sent currently if the lost data packet is found; and
  wherein the retransmitting the lost data packet to the terrestrial station comprises:
  if a data packet is being sent currently, retransmitting the lost data packet to the terrestrial station after the data packet that is being sent currently is sent.

12. The method according to claim 10, wherein the method further comprises:
  feeding back a data packet loss message to the terrestrial station if the lost data packet is not found, the data packet loss message indicating that the lost data packet is unsuccessfully sent.

13. A data transmission system, comprising:
  an unmanned aerial vehicle (UAV); and
  a terrestrial station wirelessly connected to the UAV;
  wherein the terrestrial station is configured to:
  receive data packets continuously sent by the UAV;
  detect continuity of data packet sequence numbers of the received data packets; and
  sending a data packet retransmission request to the UAV according to a lost data packet sequence number if it is detected that the data packet sequence numbers corresponding to the data packets are discontinuous, and performing packet dropping processing on a data frame comprising the data packet corresponding the lost data packet sequence number, wherein the packet dropping processing is finding, according to the lost data packet sequence number, the data frame to which the corresponding data packet belongs and discarding all data packets included in the data frame, and generating a frame dropping message according to a frame number corresponding to the data frame and is reported to the UAV;
  wherein the UAV is configured to receive the data packet retransmission request.

14. The system according to claim 13, wherein the terrestrial station is configured to:
  send at least one data packet retransmission request to the UAV if there are at least two lost data packet sequence numbers, the data packet retransmission request carrying at least one lost data packet sequence number.

15. The system according to claim 13, wherein the terrestrial station is configured to:
   determine, when a preset retransmission condition is met, whether a data packet corresponding to the lost data packet sequence number is received; and
   resend the data packet retransmission request to the UAV according to the lost data packet sequence number if the data packet corresponding to the lost data packet sequence number is not received.

16. The system according to claim 13, wherein the terrestrial station is configured to:
   determine whether a data packet corresponding to the lost data packet sequence number is received;
   determine whether a preset retransmission condition is met if the data packet corresponding to the lost data packet sequence number is not received; and
   resending the data packet retransmission request to the UAV according to the lost data packet sequence number if the preset retransmission condition is met.

17. The system according to claim 13, wherein the terrestrial station is configured to:
   receive a data packet loss message fed back by the UAV, the data packet loss message indicating that the UAV unsuccessfully sends the lost data packet corresponding to the lost data packet sequence number; and
   stop sending the data packet retransmission request according to the data packet loss message.

18. The system according to claim 13, wherein the UAV is configured to:
   query a send buffer for a lost data packet corresponding to the lost data packet sequence number according to the data packet retransmission request; and
   retransmit the lost data packet to the terrestrial station if the lost data packet is found.

19. The system according to claim 18, wherein the UAV is configured to:
   detect whether a data packet is being sent currently if the lost data packet is found; and
   if a data packet is being sent currently, retransmit the lost data packet to the terrestrial station after the data packet that is being sent currently is sent.

* * * * *